(12) United States Patent
Moth

(10) Patent No.: US 11,371,866 B2
(45) Date of Patent: Jun. 28, 2022

(54) METHODS FOR DESIGNING A FLOW CONDUIT AND APPARATUS THAT MEASURES DEFLECTION AT MULTIPLE POINTS TO DETERMINE FLOW RATE

(71) Applicant: Red Meters LLC, Orlando, FL (US)

(72) Inventor: David John Moth, Orlando, FL (US)

(73) Assignee: RED METERS LLC, Orlando, FL (US)

( * ) Notice: Subject to any disclaimer, the term of this patent is extended or adjusted under 35 U.S.C. 154(b) by 449 days.

(21) Appl. No.: 15/873,646

(22) Filed: Jan. 17, 2018

(65) Prior Publication Data

US 2018/0335328 A1 Nov. 22, 2018

Related U.S. Application Data

(60) Provisional application No. 62/507,634, filed on May 17, 2017.

(51) Int. Cl.
*G01F 1/38* (2006.01)
*G01F 1/86* (2006.01)
(Continued)

(52) U.S. Cl.
CPC .............. *G01F 1/383* (2013.01); *B01F 31/65* (2022.01); *B01F 35/2111* (2022.01);
(Continued)

(58) Field of Classification Search
CPC ... G01F 1/383; G01F 1/20; G01F 1/86; G01F 15/02; G01F 1/7086; G01F 25/0007;
(Continued)

(56) References Cited

U.S. PATENT DOCUMENTS

| 2,432,039 A | 12/1947 | Plank |
| 4,140,292 A | 2/1979 | Kaigler, Jr. |

(Continued)

FOREIGN PATENT DOCUMENTS

| CN | 101084416 A | 12/2007 |
| DE | 10340555 B3 | 9/2004 |

(Continued)

OTHER PUBLICATIONS

International Search Report and Written Opinion dated Aug. 3, 2018 in PCT/US2018/033129 (13 pgs.).

(Continued)

*Primary Examiner* — Octavia Hollington
(74) *Attorney, Agent, or Firm* — Foley & Lardner LLP

(57) ABSTRACT

Apparatus and methods for designing a system that measures deflection at multiple points and in various axes and how it relates to flow measurement are described. A system for continuously measuring the mass flow of a media includes one or more cartridges, one or more displacement sensing devices, and a processor. The one or more cartridges are connected serially between an inflow and outflow media pipe. The one or more displacement-sensing devices is configured to detect displacement changes of the one or more cartridges at two or more separate points on the cartridge(s) when the media flows through the cartridge(s). The processor is configured to calculate the flow of the media based on the detected displacement changes of the one or more cartridges at the one or more separate points.

52 Claims, 9 Drawing Sheets

(51) Int. Cl.
  *G01F 1/20* (2006.01)
  *G01F 15/02* (2006.01)
  *B01F 31/65* (2022.01)
  *B01F 35/21* (2022.01)
  *B01F 35/22* (2022.01)
  *B01F 35/71* (2022.01)
  *G01F 1/7086* (2022.01)
  *G01F 25/10* (2022.01)

(52) U.S. Cl.
  CPC .... *B01F 35/2202* (2022.01); *B01F 35/71745* (2022.01); *G01F 1/20* (2013.01); *G01F 1/86* (2013.01); *G01F 15/02* (2013.01); *G01F 1/7086* (2013.01); *G01F 25/10* (2022.01)

(58) Field of Classification Search
  CPC ............ B01F 11/0071; B01F 15/00136; B01F 15/00285; B01F 15/0238
  USPC .......................................................... 73/262
  See application file for complete search history.

(56) References Cited

U.S. PATENT DOCUMENTS

| | | | |
|---|---|---|---|
| 4,745,807 A | 5/1988 | O'Neill | |
| 4,876,879 A | 10/1989 | Ruesch | |
| 5,041,990 A | 8/1991 | Yabumoto et al. | |
| 5,831,151 A | 11/1998 | Ondrus et al. | |
| 6,089,102 A * | 7/2000 | Bloss | B67D 7/20 73/861.03 |
| 6,769,299 B2 | 8/2004 | Forster et al. | |
| 7,062,976 B2 * | 6/2006 | Gysling | G01F 1/704 73/861.18 |
| 7,216,549 B2 * | 5/2007 | Rieder | G01F 1/8409 73/861.355 |
| 7,290,447 B1 * | 11/2007 | Burnette | B01F 3/12 73/433 |
| 7,343,818 B2 * | 3/2008 | Gysling | G01F 1/704 73/861.18 |
| 7,520,162 B2 * | 4/2009 | Wenger | G01F 1/8409 73/54.41 |
| 8,915,145 B1 * | 12/2014 | Van Orsdol | G01G 1/00 73/861.04 |
| 9,322,691 B2 * | 4/2016 | Drahm | G01F 1/8413 |
| 9,389,109 B2 * | 7/2016 | Gledhill, III | G01F 1/662 |
| 9,393,793 B2 | 7/2016 | Nakamura et al. | |
| 9,446,585 B2 | 9/2016 | Goyal et al. | |
| 9,541,432 B2 * | 1/2017 | Kertesz | E03F 7/00 |
| 10,295,450 B2 | 5/2019 | Moth | |
| 2004/0190177 A1 | 9/2004 | Christie et al. | |
| 2004/0199340 A1 | 10/2004 | Kersey et al. | |
| 2004/0237642 A1 * | 12/2004 | Masuichi | G01F 1/6847 73/202.5 |
| 2007/0089483 A1 | 4/2007 | Kriel | |
| 2008/0173396 A1 | 7/2008 | Wiessner | |
| 2008/0282513 A1 | 11/2008 | Richardson | |
| 2011/0168900 A1 * | 7/2011 | Dobbs | G01N 23/00 250/360.1 |
| 2017/0016753 A1 * | 1/2017 | Shi | G01F 22/00 |
| 2017/0030798 A1 | 2/2017 | Deverse | |
| 2017/0045432 A1 | 2/2017 | Moth | |

FOREIGN PATENT DOCUMENTS

| | | |
|---|---|---|
| EP | 0 722 084 A1 | 7/1996 |
| JP | H07-253373 A | 10/1995 |
| JP | 2009-538790 A | 11/2009 |
| KR | 101338175 | 12/2013 |
| WO | WO-2012/118775 A2 | 9/2012 |
| WO | WO-2015/069100 A2 | 5/2015 |

OTHER PUBLICATIONS

AW-Lake Company, Lake Monitors, Liquid Flow Meters Installation, Operating & Maintenance Manual, 2016, 16 pgs.
Extended European Search Report dated Feb. 22, 2019 in related European Appl. 16836026 (10 pgs.).
International Search Report and Written Opinion dated Oct. 31, 2016 in PCT/US2016/047037.
Roskos, K. et al. "Simple System for Isothermal DNA Amplification Coupled to Lateral Flow Detection." PLOS ONE, vol. 8, Issue 7, Jul. 2013, 8 pgs.
U.S. Office Action in U.S. Appl. No. 15/237,033 dated Apr. 6, 2018.

* cited by examiner 1.1 Liner
1.2 Flange
1.3 First Reinforced Layer
1.4 Second Reinforced Layer
1.5 Flexible Layer
20 Spiral Reinforcement – Embedded into 1.5
1.6 Evenly Spaced higher modulus Rods – Inserted into Holes in Flange 1.2 Collars
1.7 Flexible Layer
1.8 Third Reinforced Layer
1.9 Outside Layer

METHODS FOR DESIGNING A FLOW CONDUIT AND APPARATUS THAT MEASURES DEFLECTION AT MULTIPLE POINTS TO DETERMINE FLOW RATE

CROSS-REFERENCE TO RELATED APPLICATIONS

The present application claims the benefit of priority from U.S. Provisional Patent Application No. 62/507,634, filed May 17, 2017, which is incorporated herein by reference in its entirety.

FIELD

The present invention relates to the field of measurement devices. Specifically, it relates to devices and methods for the continuous, real-time, inline measurement of the flow characteristics and unique Process Signature of continuous media flowing through a pipeline.

BACKGROUND

Other flowmeters in the market have been on the market for decades but still have many disadvantages that limit their use.

Electromagnetic flowmeters use Faraday's Law of electromagnetic induction to measure flow. Electrodes are placed at right angles to the direction of the magnetic field and flow direction of the pipe. When an electrically conductive fluid flows through the pipe, the electrodes measure a voltage. This voltage is directly proportional to the fluid velocity. While this method has many advantages such as no moving parts, unobstructed flow, and no pressure drop, this method only works for low conductive liquids. This prohibits the use of highly conductive slurries such as gold ores. This also prohibits the use of a slurry with a high concentration of entrained gases.

Ultrasonic flowmeters measure sound waves through a fluid. When the flow is zero, the frequencies of the ultrasound is unchanged. When the flow is greater than zero, the frequency of the reflected ultrasound is changed due to a Doppler effect. The use of ultrasonic flow meters is attractive because there is no pressure drop, low maintenance, and they are largely unaffected by temperature, density and concentration. However, ultrasonic flowmeters are highly reliant upon flow profile. Therefore, sediment deposits and gas bubbles largely affect the readings and cause large errors. Also, temperature, density and concentration greatly affect the way the ultrasonic wave is reflected. Large concentrations of solids may completely block the signal.

Coriolis mass flowmeters measure the mass flow rate of a fluid traveling through a tube. Coriolis meters do not measure volumetric flow but mass flow. They achieve this by measuring the change in vibrations in a curved tube. The curved tube is rotated. The heavier the tube is the slower it will rotate. This causes a change in vibration in the curved tube. This vibration measurement is highly accurate for both mass flow and density measurements. These meters are highly sensitive to vibrations, however. Therefore, gas inclusions, particulates, and improper installation may create large errors in the readings. Because vibrations are measured, the materials in the design and the diameter of the meter is highly limited. The diameter cannot exceed approximately 6" but even at that size is often cost prohibitive.

Differential pressure flow meters use Bernoulli's equation to measure the flow across an aperture in a pipe. The small aperture causes a pressure drop that is measured by two pressure gauges. When the flow increases, a greater pressure drop is created. Bernoulli's equation states that the pressure drop is proportional to the square of the flow rate. This is inhibitive as this drastically reduces the span that may be measured (ten percent of full scale flow only produces one percent of the full scale differential pressure). While cheap and universally useful for liquids, gases and steams, the pressure drop caused may be inhibitive for some applications. Because of the intrusive design, solids cannot be included in the flow.

Turbine flowmeters use the mechanical energy of the fluid to rotate a pinwheel rotor located in the stream. Blades of the rotor are angled to transform energy into rotational energy. As the speed of the flow increases, the rotor spins proportionally faster. Turbine flowmeters have the benefit of being viable at extreme temperatures and pressures (used in cryogenic applications). However, they cannot be used in high viscosities, are extremely sensitive to contamination and are affected by the flow profile.

Variable area flowmeters feature a tapered tube with the wider end up. Inside the tube, a float moves freely up and down. The medium flows through the flowmeter from the bottom to the top and around the float. This flow raises until there is an annular gap and an equilibrium is established. Three factors act upon the float: buoyancy, mass and flow force. While inexpensive and suitable for liquids, gases and steam, variable area flowmeters need to be mounted vertically and always cause a constant pressure drop. They are also affected by solids concentration, density, temperature and viscosity changes.

Vortex flowmeters measure the flow velocity of liquids and gases in a full pipe. Vortex flowmeters use the Karman effect to measure the period between eddies created by a blockage, shedding street, built into the pipeline. This blockage is characterized by a broad, flat front with a tapered end. The eddies are created one side of the street then the other side. The eddies are formed perpendicular to the pipe axis. The flow velocity is proportional to the frequency of the vortices. The flow rate is then calculated by multiplying the area of the pipe by the velocity of the flow. Vortex flowmeters are unaffected by pressure, temperature and density. However, they are intrusive and do not have strong readings for low flow rates.

In many industries, companies are looking for flowmeters that hit various design points. Many points are more important for different applications. Many factors that are important to the design of flowmeters include the following: no obstructions within the pipe, little to no pressure drop; no sensitivity to the flow profile; no sensitivity to temperature, density and conductivity; ability to change materials to combat chemically and physically aggressive media; operable in both flow directions; wide range of flow velocities; and low maintenance.

SUMMARY

In view of the limitations of previous flowmeters, embodiments of the invention include an apparatus and method for measuring the flow while not interfering with the integrity of the system in place. According to one embodiment of the present invention, the apparatus may be flanged to the existing piping body. This embodiment may be altered to accommodate many different applications. These alterations may include various liners designed to resist wear and corrosion due to chemical and physical means, regulatory compliance with specific media, resistance to a variety of specific processing conditions and requirements, no pressure drop and an insensitivity to conductivity. This apparatus may also be equipped with additional sensors to measure additional variables applicable to various industries, such as wear detector(s), temperature sensor(s), vibration sensor(s), impact sensor(s), various motion sensor(s), deflection measurement device(s), chemical sensor(s), biological sensor(s) and line pressure sensor(s). When coupled with a density meter, these variables may include mass flow and percentage solids. This apparatus may act as a single component that may be attached inline to existing pipework common to those in the industry. This apparatus' inflow and outflow are attached in a manner appropriate to those versed in the art with proper flanging and gasketing to ensure that there are no leaks that may damage the apparatus or system. The apparatus may comprise a plethora of additional sensors as determined by the installed process, including but not limited to wear sensor(s), temperature sensor(s), vibration sensor(s), impact sensor(s), various motion sensor(s), deflection measurement device(s), chemical sensor(s), biological sensor(s) and line pressure sensor(s). The entire apparatus may be one component with multiple measure locations that act in a reliable, consistent and repeatable manner.

The main output of the apparatus according to some embodiments comprises a unique Process Signature ("RM Signature") that is unique to each medium in each installation. The RM Signature characterizes the nature of the process given a specific media. By installing the apparatus, process engineers may analyze the performance of the process and the condition of the media within the pipeline. This data may be critical to the Statistical Process Control of the process. The RM Signature may be used to determine many factors, including homogenization of mixes, the degree of flocculation, process blockages, specific gravity of the media and the flow rate of the media within the pipeline, allowing the mass flow to be accurately measured.

DETAILED DESCRIPTION OF THE INVENTION

The invention will now be described in greater detail regarding the drawings. This description is merely one embodiment of one such configuration of the system. This description should not be limited to only the embodiment set forth within. This embodiment is provided to allow a thorough sense of the scope and capabilities of the invention and method.

It should be noted that in the present description the terms describing the objects should be understood to mean that the main testing cartridge 1 lies along the x-axis and the displacement sensing device 2 pointing along the z-axis. These dimensions should be realized in a three-dimensional Euclidean space. It should be understood that in the present description the terms "upper", "lower", "front", "vertical", "horizontal" and derivatives thereof should relate to FIGS. 1-3 and the orientation of objects described.

It should also be noted that the term "media" be understood to represent a wide array of suitable materials, including but not limited to liquids, slurries, sludges, oils, dehydrated media, gaseous media, solids such as powders, and any other flowable material.

Figure 1:
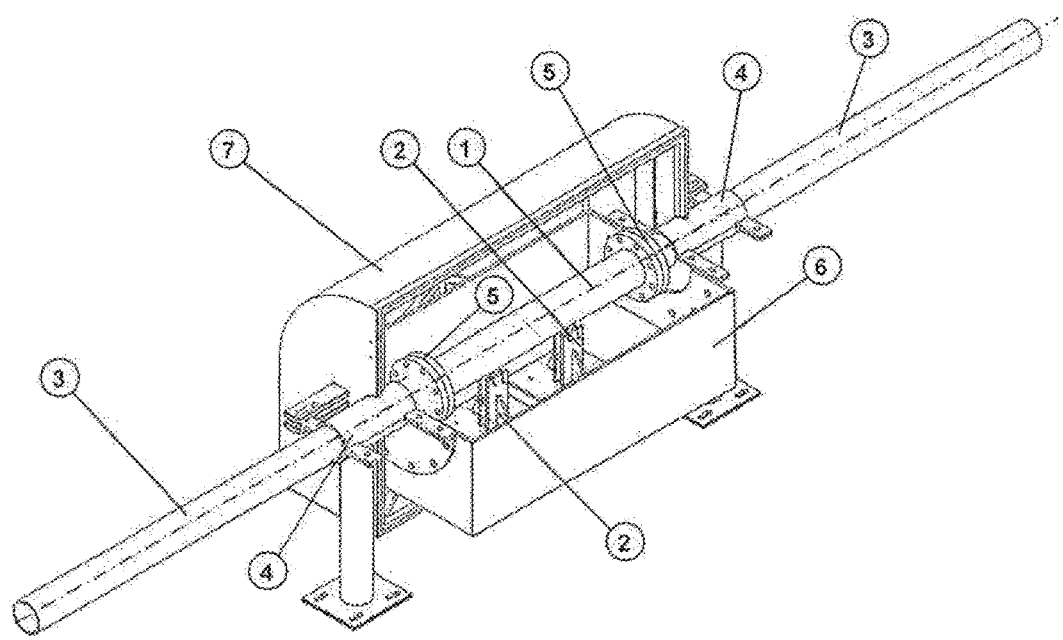
FIG. 1 is an isometric view of an apparatus for measuring the flow of a media while not being affected by pressure drops and temperature changes. The apparatus features multiple sensors to measure the pressure and temperature as well as the mass inside of the pipe at multiple points, according to embodiments of the present invention.
Figure 2:
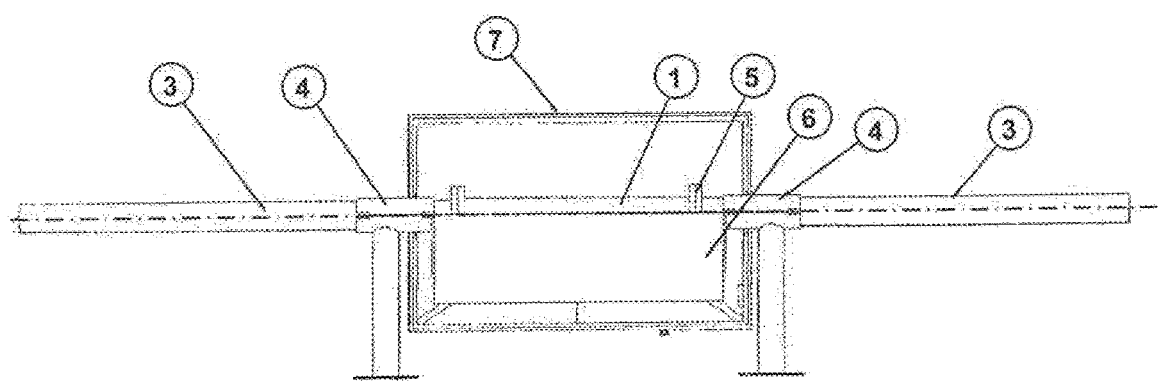
FIG. 2 is a cross section view of the apparatus setup of FIG. 1.

Regarding FIG. 1, a system (apparatus 100) is described that holds a flowing media (not shown) and includes a flexible cartridge 1 in an enclosure 7 with a horizontal piping configuration 3. The flowing media flows within the cartridge 1. The piping configuration 3 passes through the sides of the enclosure 7. The piping configuration 3 has two connections 5, at an input and output respectively, to the flexible cartridge 1. These flanged or coupling connections 5 shown are merely one method of connection and are recognizable to those versed in the art. The piping configuration 3 may be supported by multiple vertical supports 4 and connected to the ground. The vertical supports 4 are secured via fasteners known to those in the industry.

The two vertical pipe supports 4 are used to act as a vibration reducer. While two supports are illustrated, more supports may be desirable. These supports 4 may be made of carbon steel for its sturdiness and its workability. Other materials may be substituted at the discretion of those versed in the art. The two vertical pipe supports 4 may comprise supporting columns configured to support the cartridge 1 at any point or points between ends of the cartridge 1.

The enclosure 7 may be raised above the ground to minimize the effects of vibration from the ground. The vertical supports 4 have flanged connection that attach to a measurement device box 6. The measurement device box 6 has minimal contact to the displacement sensing device 2 to reduce the amount of vibrations that reach the displacement sensing device 2, which may include a laser, for example.

This system and method may also include a temperature-sensing device 12 and a pressure-sensing device 10 (see FIGS. 4A-4C), which may be disposed inside the enclosure 7 to measure the conditions of the apparatus. The system may also include impact or vibration sensors.

According to this embodiment, the cartridge 1 may be connected in series to the horizontal piping configuration 3. The cartridge 1 may be made of flexible material, for example rubber. The flexibility allows for a vertical displacement of the cartridge 1 when media flows through the cartridge 1. The cartridge 1 may have a vertical linear displacement proportional to the mass of the flowing media.

The measurement device box 6 may include a displacement-sensing device 2 mounted on a base. Preferentially, the displacement-sensing device 2 may be mounted underneath the cartridge 1. This should be mounted according to specifications specific to the measurement mounting device. In one embodiment, the displacement sensing device 2 includes a high-precision and high-speed displacement sensor. This sensor is merely an exemplary embodiment and other embodiments are possible. The sensor may comprise a radio detector, such as radar, an optical detector, such as a laser, an acoustic displacement detector, a mechanical displacement detector, an electro-mechanical displacement detector or a piezoelectric displacement detector. An optical detector or reflector, referred to as a target, may be incorporated into the cartridge, or the surface of the cartridge itself may be used as a target for non-contact measuring devices. The radio wave and optical emitter and receiver, such as a Radio Detection and Ranging (RADAR) or Light Amplification by Stimulated Emission of Radiation (LASER) measuring devices, may comprise a continuous wave or pulsed wave emission. The movement of the cartridge 1 may be measured by comparing the characteristics of the emitted wave to the wave returned from the target area on the cartridge. By comparing the phase shift or by measuring the time required for a wave pulse to be reflected from the target, for example, very accurate measurements of distance may be obtained. Since laser pulses may be as short as $1 \times 10\text{-}15$ seconds, readings as close as practicable to instantaneous may be obtained.

Similarly, an acoustic emitter and receiver, such as an ultrasonic measuring device, measures the change in emitted versus the returned sonic wave.

Electrical and electro-mechanical devices correlate a change in electrical properties versus the distortion of a conductive element or movement of mechanical components.

Mechanical measuring devices simply record the movement by displacement of mechanical components.

The measurement device box's 6 main utility is to hold the displacement measurement device. This box 6 may be made of a material with a low coefficient of thermal expansion (CTE). The box 6 may be constructed in a multitude of different patterns to minimize the effects of vibration from the flow. The side walls of the box 6 are connected to the vertical supports. This connection is typically bolted together because this allows for the box to be removed. Other types of connection are also possible. Gasketing may be added to further reduce the amount of vibration.

The displacement-sensing device 2 may include, as an alternative to including a laser, a linear variable differential transformer (LVDT), ultrasonic detector, or a strain gage, for example.

The displacement-sensing device 2 is preferably a non-contact sensing device, such as including a laser, so the displacement-sensing device 2 does not contact the cartridge 1.

The displacement sensing device 2 may be disposed inside an enclosure 7. This enclosure 7 may be made of a low electrical conductivity material such as aluminum. The enclosure may typically have a smooth surface with a curved aerodynamic top to prevent rain and snow from accumulating on top of the apparatus. The enclosure 7 may also be used to minimize temperature and humidity fluctuations and effects due to weather (i.e. wind and rain). The inflow and outflow pipes 3 pass through openings in the sidewalls of the enclosure 7. The base of the displacement sensing device 2 is disposed inside the box 6 and inside the enclosure 7. The enclosure 7 is made to lock and seal, protecting the contents within.

The enclosure 7 can minimize the effects of the outside temperature and humidity on the measurements. Therefore, the enclosure 7 is preferentially lightweight to reduce the amount of strain on the system.

After an accurate measure of the displacement of the cartridge 1 is obtained, a mass value may be generated. This value may be used to calculate the flow if the cartridge volume is known (the volume of the cartridge does not change).

A pressure-sensing device 10 (see FIGS. 4A-4C) may be used to monitor the pressure within the pipeline. Leaks and breakages, as well as valve openings in the pipeline, may cause changes of pressure. A pressure reading of zero may indicate a break in the system. A large increase in pressure may cause the cartridge 1 to explode. Safety measures are employed to ensure that the pressure is controlled. The pressure-sensing device 10 may serve as an alarm in case of a large pressure deviation. In some embodiments of this design, a wear sensor may be installed to indicate the utility of the cartridge. The pressure sensing device 10, the temperature-sensing device 12, and/or the displacement-sensing device 2 reading outside of the intended range may send an alarm.

The cartridge 1 may be lightweight, making its mass negligible compared to the flowing media within. The cartridge 1 may also be flexible on the micron scale, so that it will deflect by an amount that scales with its mass. The cartridge 1 is preferably made of a material with a low thermal expansion to minimize the effect of temperature, for example, Polyaramid fabric. This lightweight material may be highly resistant to changes in temperature. In one iteration of the design, an abrasion-resistant or corrosion-resistant liner (e.g. a resistant rubber) may be placed on the inside of the cartridge 1. The cartridge 1 may comprise a microbial or biohazard resistant liner. The cartridge 1 may comprise a liner resistant to extreme temperature environments. This allows for the apparatus to withstand abrasive slurries and extends the lifetime of the device. Deflection and displacement of the cartridge 1 may be detected and quantified by the displacement-sensing device 2. The deflection may be translated into a force and a mass may be calculated based upon the force. The magnitude of the force increases proportionately with the mass of the media within the cartridge 1. Similarly, the force due to gravity that is applied to the cartridge 1, causes a predictable, measurable and proportionate deflection of the cartridge 1, in a direction perpendicular to the x-axis. If the cartridge 1 cannot recover to its original shape after the mass of the slurry has been removed, the displacement measurement will not be accurate. Thus, the cartridge 1 is comprised of a system that recovers its original shape in a repeatable fashion. A constant baseline reference may be used to increase the accuracy of real-time density measurements. The cartridge 1 may have a vertical linear displacement proportional to the mass of the flowing media.

Figure 5A:
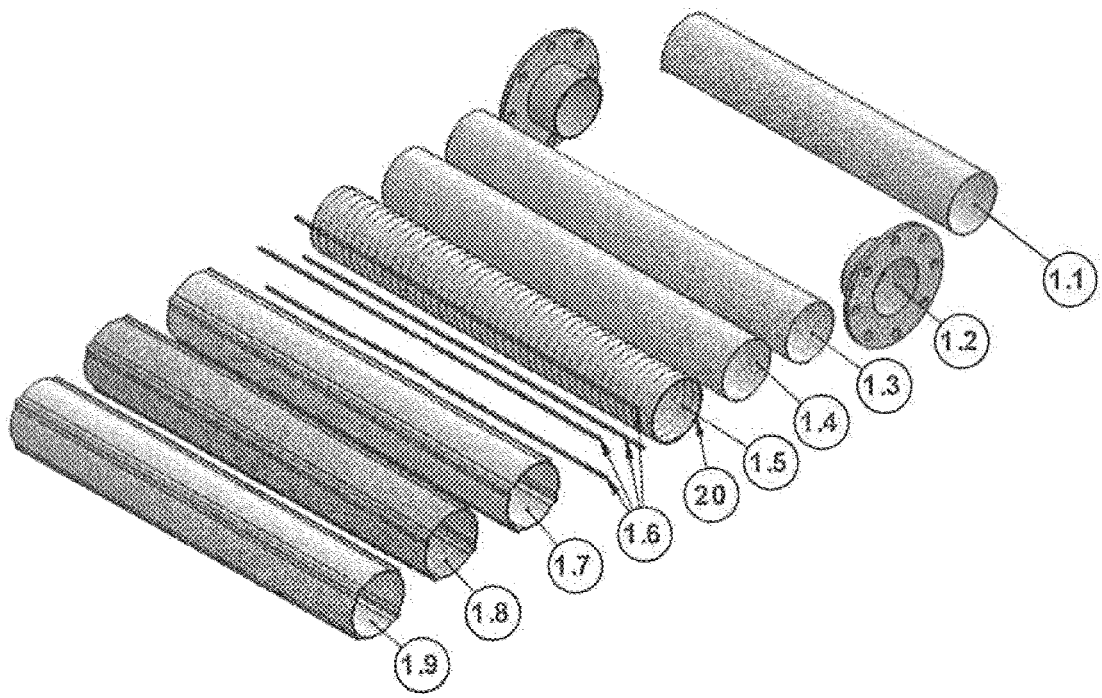
FIG. 5A is a side view of the cartridge with a helical wire according to embodiments of the present invention.

The cartridge 1 may also be equipped to resist deformations caused by pressure change. A pressure control system may be implemented within the cartridge 1. In this aspect, a helical wire 20 may be implanted within the material, such as rubber, of the cartridge 1 as shown in FIG. 5A. The wire may also provide resistance to vacuum-like conditions and maintains the shape of the cartridge 1. In this design, a plurality of high-modulus (mechanically stiff) beams of various cross sections and second moment of area are inlaid directly in the wall of the cartridge 1 as well. These beams are placed evenly spaced along the outside radius. The high-modulus beams operate well within their elastic limit, therefore always return to their pre-deflected position after the force has been removed.

Figure 5B:
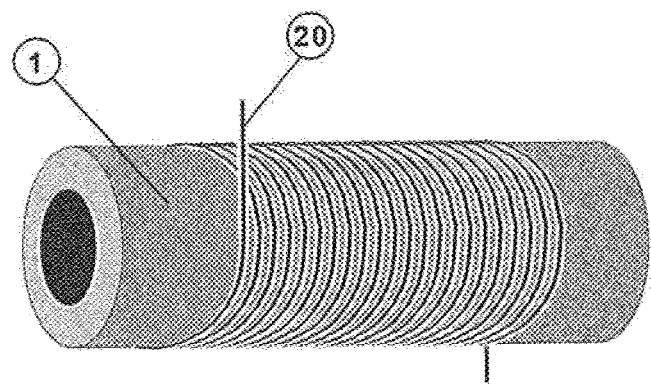
FIG. 5B is an exploded view illustrating typical cartridge components according to a specification application of embodiments of the present invention.
Figure 6:
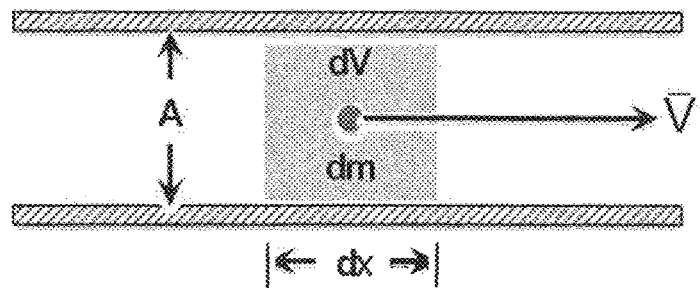
FIG. 6 illustrates a view of an elemental mass traveling in a tube for calculating a mass flow rate.

FIG. 5B illustrates typical cartridge components for one specific application. Referring to FIG. 5B, an exploded view of the cartridge 1 is shown. The cartridge 1 can also be configured to resist pressure change as pressure can change the flexibility of the cartridge 1. A pressure control system can be implemented inside the cartridge 1. In an aspect, a helical wire 20 is implanted in the wall of the cartridge 1 (see FIG. 5A). The pitch of the wire will have a direct impact on the flexibility of the cartridge 1. The wire can also provide resistance to vacuum-like conditions and maintain the shape of the cartridge, important accurate readings. In another aspect, a plurality of high-modulus (i.e. mechanically stiff) tubes are inlaid directly in the wall of the cartridge. These tubes are positioned at points rotated 45°, 135°, 225° or 315° about an axis coincident with the centerline of the cartridge. The high modulus tubes enable the cartridge to return to a reliable zero point, that is, the position of the cartridge given the weight of the cartridge plus the weight of the liquid inside. The number and thickness of the tubes can be altered for different applications. The tubes are not only affixed to the wall of the cartridge itself but also to the flange (e.g., built in rubber flange) connections. Fixed points allows the tubes to flex and encourages the cartridge to return to a defined location. The high modules tubes can be made of carbon fiber tubes or other suitable materials.

The addition of the high modulus beams eliminate all time dependent characteristics such as creep and stress relaxation phenomena that require complex compensation algorithms, thereby enabling the cartridge to return to a reliable zero point in a predictable and measureable fashion, that is, allowing very accurate determination of the position of the cartridge 1 given the mass of the cartridge plus the mass of the media inside. The quantity, cross section and second moment of area of the beams may be altered for different applications. The beams are not only affixed to the wall of the cartridge 1 but also to the end flange or coupling or any other methods of connecting pipes. Fixed points allow the beams to flex and ensure that the cartridge 1 is returned to a defined position. The high-modulus beams may comprise metal, ceramic, fibrous composite materials, such as carbon fibers or glass fibers, or another suitable organic, inorganic or composite material.

Figure 4A:
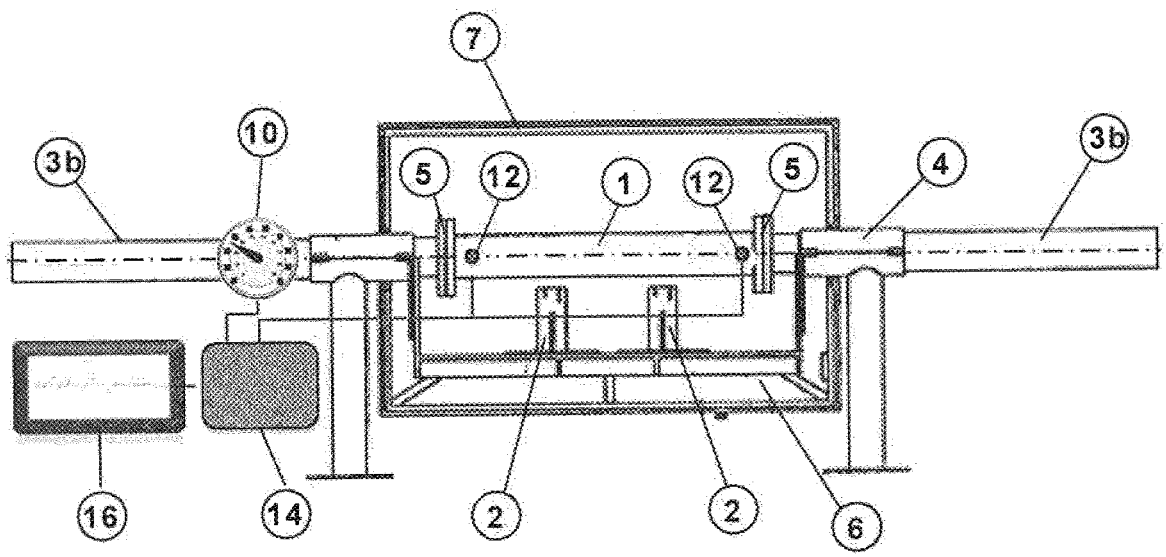
FIG. 4A is a schematic of a portion of the apparatus illustrating the pressure, temperature and displacement sensing devices, and the processor and display, according to embodiments of the present invention.
Figure 4B:
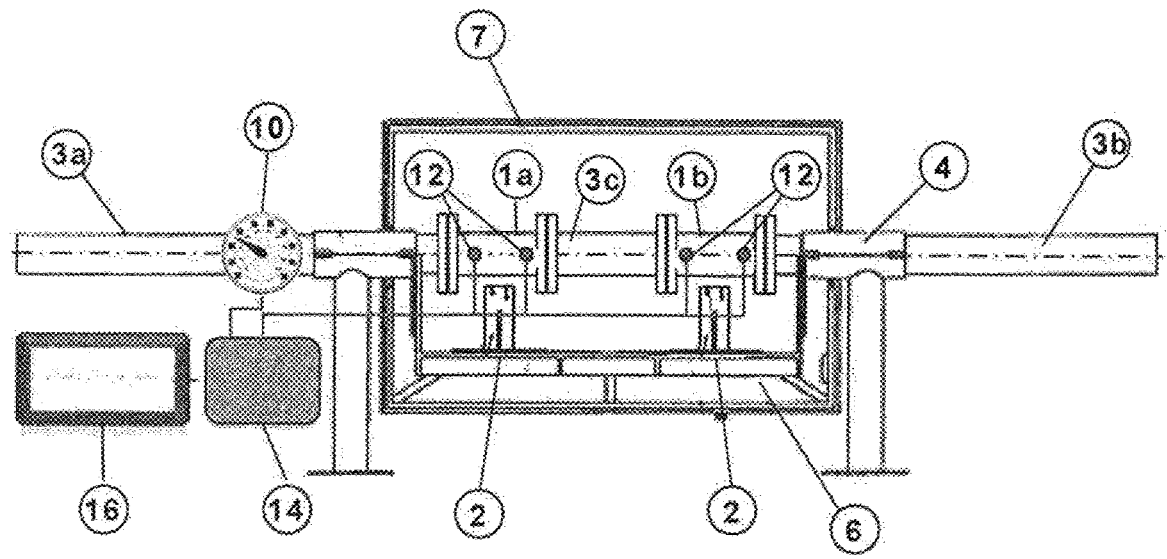
FIG. 4B is a schematic of a portion of the apparatus illustrating the pressure, temperature and displacement sensing devices, and the processor and display, including two separated cartridges, according to embodiments of the present invention.
Figure 4C:
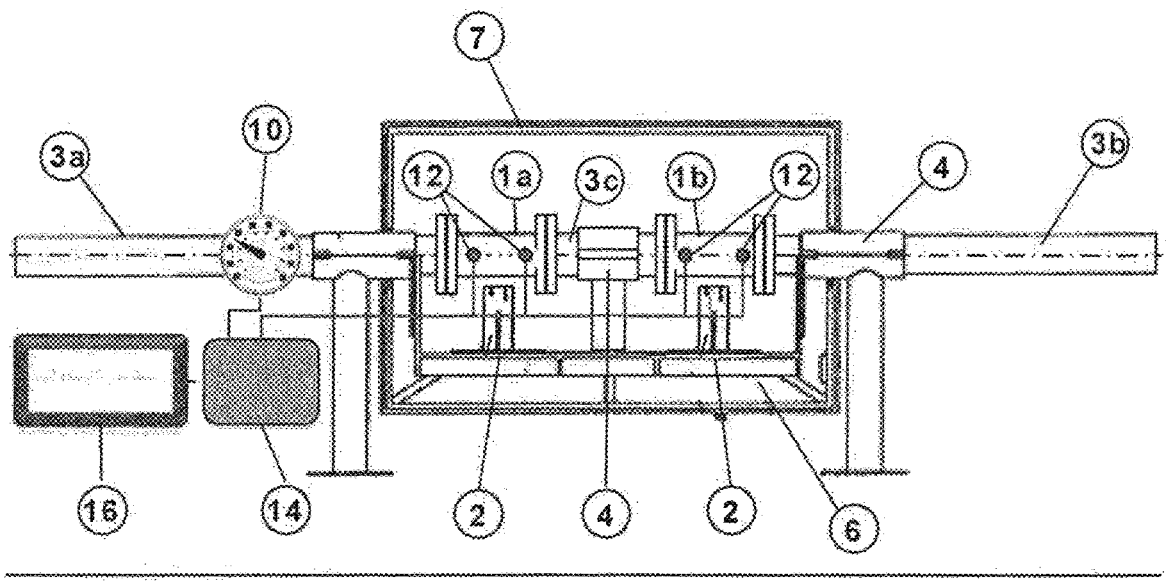
FIG. 4C is a schematic of a portion of the apparatus illustrating the pressure, temperature and displacement sensing devices, and the processor and display, including two separated cartridges, with vertical supports between the separated cartridges, according to embodiments of the present invention.

As shown in FIG. 4A, processor 14 is connected to the different components, such as the displacement sensing devices 2, pressure sensing devices 10, and temperature sensing devices 12 and all other devices that may be added to the apparatus, depending on the nature of the application. The processor 14 acquires all relevant data, and may process data at a rate of up to one femtosecond. This data includes the temperature, pressure, laser sensor voltage, mass, force, vibration, impact, external loads, such as wind load etc. This data may be used to calculate a variety of values including mass, density, specific gravity, mass flow and other related quantities. The collected data and calculated values may be displayed on a local display device 16, for example. The data may be displayed as graphics, tables, numbers or other suitable formats. The local display 16 may be placed in a housing that satisfies standard National Electrical Manufacturers Association (NEMA) requirements. This housing may protect the measurement system from the effects of weather, fire and dust as well as other adverse conditions. FIGS. 4A-4C also show the inflow pipe 3a and the outflow pipe 3b.

Figure 3:
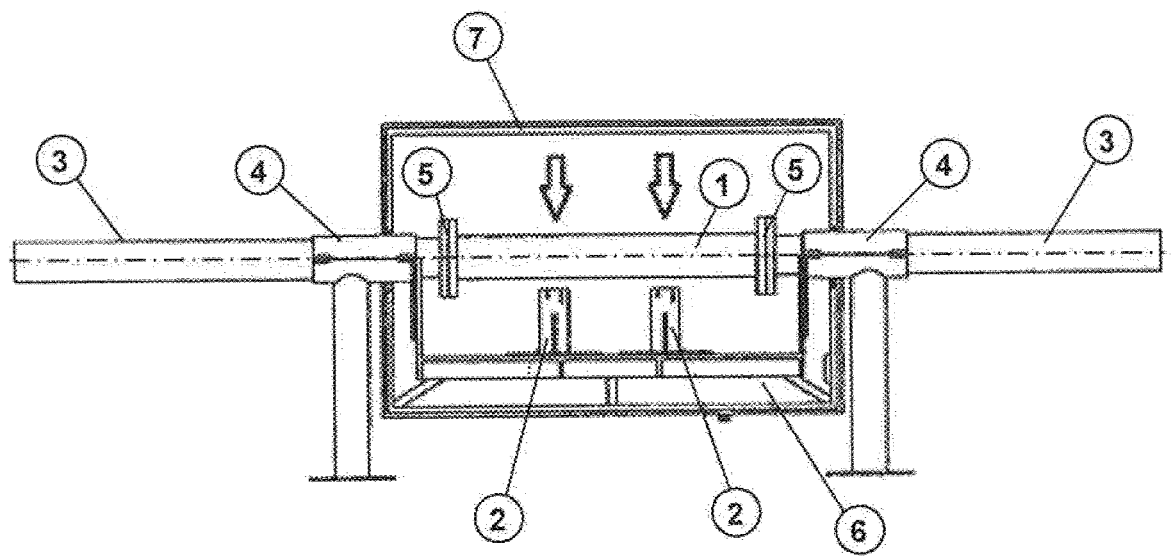
FIG. 3 is a diagram illustrating an example of how the flow would be measured in the pipe.

The main method for measuring the flow is to measure the displacement created by changes in mass in the cartridge 1. By adding a mass to the cartridge via a moving media within the cartridge, the cartridge deflects. When a piece of debris entrained within the media being analyzed is above one of the deflection measurement devices 2, the device 2 will generate a voltage in the deflection-measuring device. This deflection may be translated into a mass measurement using simple beam deflection equations. If the cross sectional area of the inside of the tube is known or measured, the volume flow may be determined. Based on the cross sectional area and the particle velocity, the flow may be determined. Similarly, as any media passes through the cartridge 1, the specific mass of the media will apply a force to the cartridge as a result of gravitational force. The magnitude of the force increases proportionately with the mass of the media within the cartridge 1. The force due to gravity that is applied to the cartridge 1, causes a predictable, measurable and proportionate deflection of the cartridge 1, in an axis perpendicular to the x-axis, therefore facilitating the direct measurement of mass of the media within the controlled volume of the cartridge. This measurement of mass is one of the two critical factors in determining mass flow. As seen in FIG. 3, a particle traveling through the pipeline will cause a deflection at the first of the plurality of displacement sensing devices 2 and then proceed towards the second of the displacement sensing devices 2. This particle will form an integral part of a unique and specific Process Signature (RM Signature) that is unique to each media and specific operating conditions. A plurality of sensing devices 2 may be placed along the length of the cartridge 1. Since the particle will not change in meaningful size and mass between the plurality of points because the points are near each other, a similar reading will be acquired on each device. A processor 14 may measure the phase shift in the Process Signature and measure the time shift between the Process Signatures. This phase shift represents the time interval between the plurality of measurement devices, or $\Delta t$—the second of the two critical elements required to determine mass flow. Using a simple velocity equation, the velocity of the particle may be ascertained. Temperature, pressure and vibration readings are compensated for by the processor 14 by determining independently the affect of each process variable on the response of the RM Signature. Once the mathematical algorithm that characterizes the affect for each process variable is determined, these affects are subtracted from the final result to yield an RM Signature that is associated only with the media flowing through the cartridge 1]. Temperature may affect the rigidity of the flexible cartridge 1.

Pressure may make minute changes in the shape, which affects the displacement reading, and vibration may result in harmonics that affect the RM Signature. All three are predictable, measureable and repeatable, and therefore may be characterized mathematically and compensated for accordingly. Other anomalies, such as external impact or the movement of a coagulated mass travelling through the cartridge 1 may also be detected and isolated within the RM Signature. Due to the response time of the device, immediate corrective action may be taken to ensure these disturbances or coagulated masses are excluded or ejected from the process flow.

FIG. 4B illustrates another embodiment of the flow meter system. FIGS. 1-4A illustrate embodiments where the flow meter system has two displacement measuring devices 2 detecting displacement of one cartridge. Alternatively, as illustrated in FIG. 4B, the flow meter system may include two cartridges 1a and 1b, with a different displacement-measuring device 2 for each of the cartridges 1. The two cartridges 1a and 1b are separated via intermediate flow pipe 3c. The system of FIG. 4B includes inflow pipe 3a flowing media into cartridge 1a and outflow pipe 3b flowing media out of cartridge 1b. Intermediate flow pipe 3c flows media from cartridge 1a to cartridge 1b.

In a similar manner to the embodiment of FIGS. 1-4A, in the embodiment of FIG. 4B a particle traveling through the pipeline will cause a deflection at the first of the displacement sensing devices 2a, pass through the intermediate flow pipe 3c, and then proceed towards the second of the displacement sensing devices 2b. Since the particle will not change in meaningful size and weight between the two points because the points are near each other, a similar reading will be acquired on both sensing devices 2a and 2b. A processor 14 can measure the time between the readings. Using a simple velocity equation, the velocity of the particle can be ascertained. If the cross sectional area of the inside of the tube is known or measured, the volume flow may be determined. Based on the cross sectional area and the particle velocity, the flow may be determined.

FIG. 4C is an embodiment similar to that of FIG. 4B, but with a support 4 between the separated cartridges 1a and 1b.

The system described above is configured to determines the flow of media passing through the cartridge 1 based on the displacement measured by the displacement sensing devices 2. Additionally, or alternatively, the system may determine the mass density or specific gravity of the media passing through the cartridge 1 based on the displacement measured by one or both of the displacement sensing devices 2. As described above, the displacement may be translated into a force and a weight may be calculated based on the force. The mass density may then be calculated based on the weight and a known or measured cross section or volume within the cartridge 1.

Mass Flow Rate

The governing equations employed in the measurement of mass flow rate for conventional processes are described below.

Consider an elemental mass dm flowing through a control volume, having a cross-sectional area A perpendicular to the axis of the tube, a volume dV, a length dx, and an average steady velocity V, may be described as follows:

$$dm = \rho dV = \frac{dV}{v}$$

-continued $$dV = A dx$$

Mass flow rate ($\dot{m}$) may be defined as follows:

$$\lim_{\Delta t \to 0} \frac{\Delta m}{\Delta t} = \frac{dm}{dt}$$

$$\dot{m} = \frac{dm}{dt} = \rho \frac{dV}{dt} = \rho A \frac{dx}{dt} = \rho A \overline{V} = A \overline{V}/v$$

Therefore:

$$\dot{m} = \rho \dot{V} = \dot{V}/v = \rho A \overline{V} = A \overline{V}/v$$

Where:
$\dot{m}$ is the mass flow rate (kg/s)
$\dot{V}$ is the volumetric flow rate (m³/s)
$\rho$ is the density (kg/m³)
$v$ is the specific volume (m³/kg)
$\overline{V}$ is the velocity (m/s)
A is the flow area (m²)

With respect to some embodiments presented, the mass flow rate, may be directly attained via physical measurements of the mass within the controlled volume coupled with the time taken for the mass or "plug" to move through the controlled volume. The governing equation is simply as follows:

$$\dot{m} = \frac{dm}{dt}$$

Figure 7:
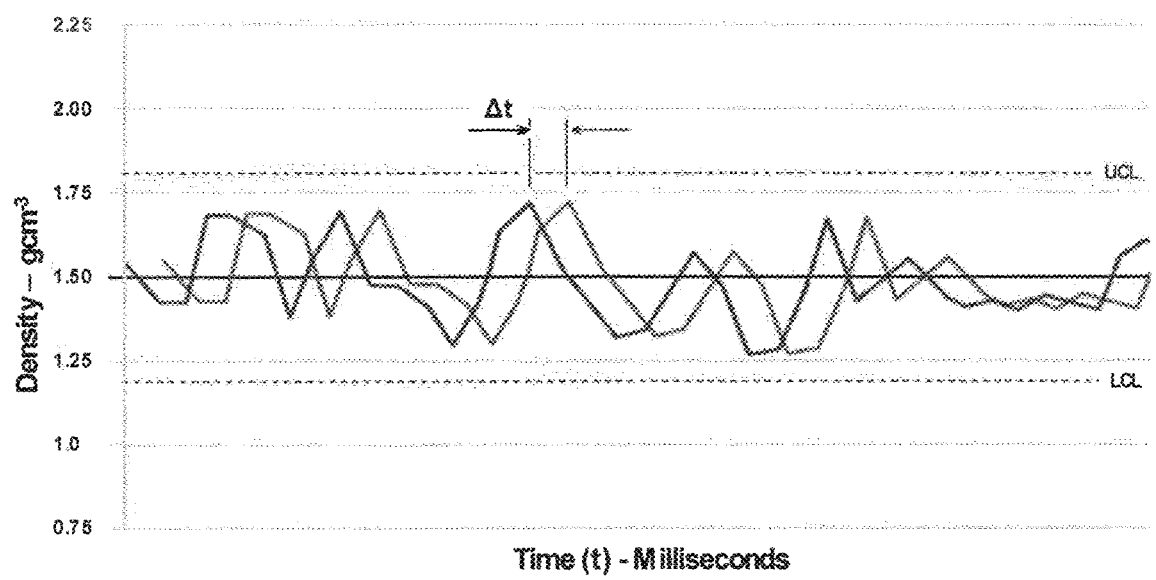
FIG. 7 is a graph showing a determined mass as a function of time using two displacement sensing devices according to embodiments of the present invention.

FIG. 7 shows an output of the direct physical measurements attained according so some embodiments. In particular, FIG. 7 shows the mass determined as a function of time. The apparatus produces a process signature that is uniquely associated with the specific process being analyzed. The initial displacement sensing device records the signature with respect to change in mass ($\Delta m$). A subsequent displacement sensing device records the same signature at a time ($\Delta t$) apart from the initial measurement. Knowing the exact distance between the displacement sensing devices, the movement of mass vs. the time taken to move between a plurality of points yields the physical data required to accurately measure mass flow rate ("m dot").

Figure 8:
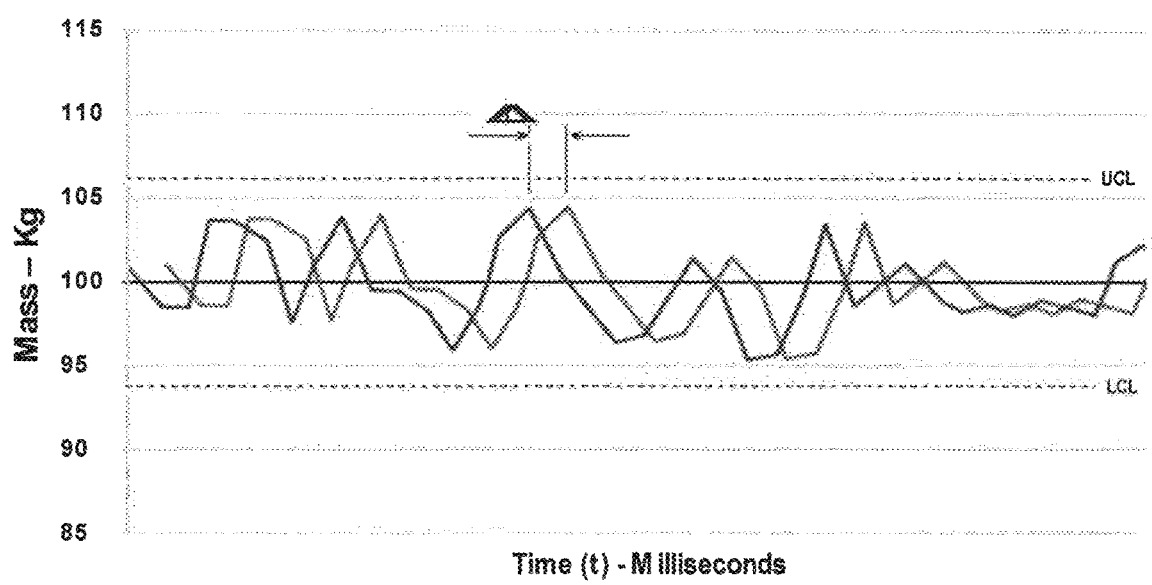
FIG. 8 is a graph showing a determined mass density as a function of time using two displacement sensing devices according to embodiments of the present invention.

Process Monitoring and Control:

FIG. 8 shows the output of the direct physical measurement with the density of the material derived as a function of time based on the apparatus 100 according to some embodiments.

The apparatus 100 produces a process signature that is uniquely associated with the specific process being analyzed. Upper and lower control limits based on standard deviation or the Process Capability Measurement (Cp and Cpk) may be calculated by the end user to ensure the process remains within specific critical limits to assure quality of the product being monitored. The apparatus may be then employed as a Statistical Process Control (SPC) device to monitor process variation. The apparatus may be employed as a detector, monitor or process controller for the process.

As a detector: —the apparatus alerts the end user to any situation that may cause the process to drift out of control, as defined by warning limits set by the end user.

As a monitor: —the apparatus provides the end user with critical and continuous process variation data in real time.

The end user may employ the apparatus to measure process capability (Cp, Cpk) prior to commissioning the apparatus as a process monitor. Visual alerts to the end user will allow the operator to take immediate corrective action should the process require attention.

As a process controller: —the apparatus may be employed in an automated closed loop. When used in this scenario, the apparatus may alert other computer-controlled devices to take corrective action automatically and instantaneously should a process related issue be detected.

Process Capability Measurement (Cp & Cpk)

Cp and Cpk are considered short-term potential capability measures for a process and are critical measures associated with Statistical Process Control (SPC). In Six Sigma terms, they describe processes quality in terms of sigma which provides an easy way to compare the capability of different processes using a common mathematical framework. Regarding the difference between Cp and Cpk, the 'k' represents a centralizing factor. The index takes into consideration the fact that the process data may not be centered.

Example Application

Figure 9:
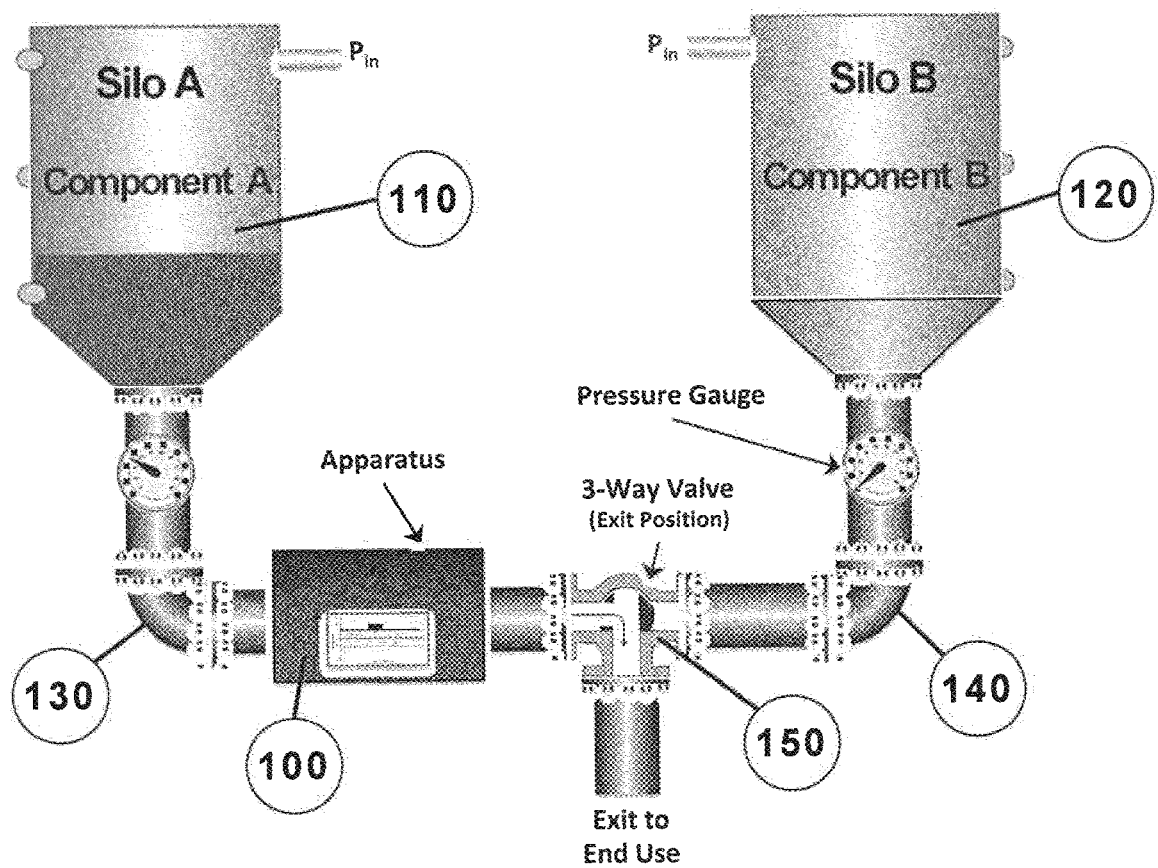
FIG. 9 illustrates a process layout including an apparatus according to embodiments of the present invention.
Figure 10:
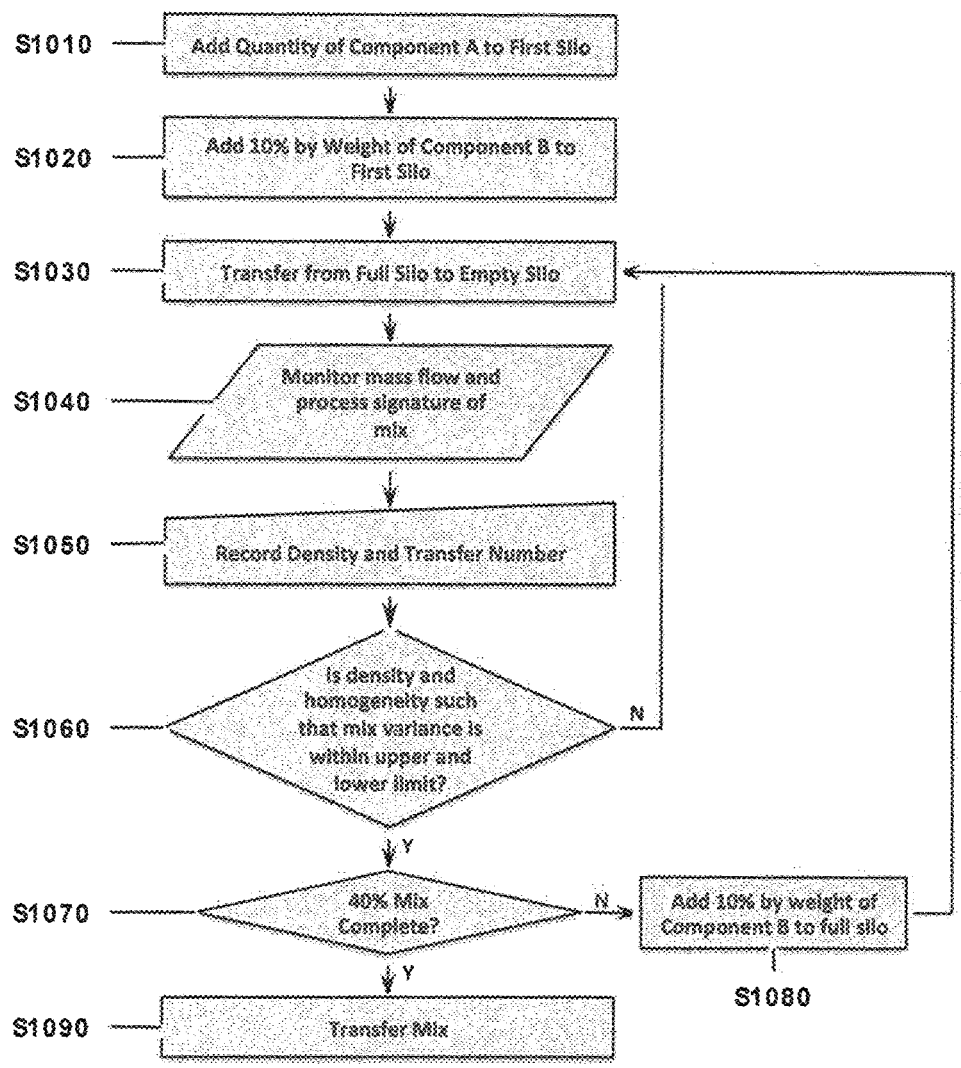
FIG. 10 illustrates a process flow chart of an exemplary application process for mixing two components of different specific gravities according to embodiments of the present invention.

The following is an example of a process on which the apparatus 100 may be deployed. FIG. 9 illustrates the process layout including the apparatus 100, while a particular process flow chart is shown in FIG. 10. The process layout in FIG. 9, includes, in addition to apparatus 100, first silo 110, and second silo 120. A component in first silo 110 is provided to the apparatus 100 via first pipe 130, where the component then passes to three-way valve 150. A component in second silo 120 is provided to the three-wave valve 150 via second pipe 140. The three-way valve 150, dependent on how it is actuated, allows for media to pass from the first silo 110 or second silo 120 to an exit, or allows for media to pass between the first silo 110 and the second silo 120.

According to some embodiments, the process flow comprises mixing and monitoring two components of differing specific gravities to determine whether the two components are sufficiently mixed. The process begins by adding a quantity of Component A to first Silo 110 in step (S1010). A fraction of Component B is progressively added to the system in increments of 10% by weight until 40% by weight of Component B is added. Initially, 10% by weight of Component B is added to the first Silo as in step (S1020). The first Silo is pressurized and the three-way valve 150 blocks the exit and allows material transfer to the second Silo B120 step (S1030). The Apparatus 100 monitors the process signature and mass flow rate of the mixture in step (S1040) to ensure the mix ratios are consistent throughout the process and that the correct weight of each component has been added. In step (S1050) the density and transfer number of the mixture is recorded.

The mixture may be transferred back and forth between silos 110 and 120 until the Apparatus 100 indicates that the material is homogenized, and the mass of material passing through the Apparatus 100 is confirmed. Specifically, it is determined whether or not the density and homogeneity are such that the mix variance falls within upper and lower control limits as in step (S1060). If the mix variance is not within upper and lower control limits, process flows to step (S1030). If the mix variance is within upper and lower control limits, process flows to step (S1070), where it is determined whether 40% of Component B has been achieved yet. If 40% has not been achieved, the process flows to step (S1080) where 10% more of Component B is added to the mix in the full silo, and then to step (S1030) where there is a transfer of the mix from the full silo to the empty silo. The process is repeated as additional quantities of Component B are added until the desired mix ratio is achieved. When the Apparatus 100 confirms the total mass of material mixed, in this case when 40% component B is mixed, and indicated that the mix variance falls within the upper and lower control limits, the three-way valve 150 is positioned to allow the final mix to be evacuated from the full Silo. The Apparatus 100 again conducts a final analysis of the weight transferred and the homogeneity as the mixture is delivered to the next stage of the process or to the end use destination as in step (S1090).

In general, the preceding description should be considered exemplary and illustrative. The present invention is not necessarily limited. Rather to those skilled in the art, it should be considered that with additional modifications and adaptations for extenuating circumstances will fall within the scope of this invention as shown and described.

What is claimed is:

1. A system for continuously measuring the flow of a media, comprising:
   a. one or more cartridges connected serially along the flow of the media between an inflow media pipe and an outflow media pipe;
   b. one or more displacement sensing devices configured to detect displacement changes of the one or more cartridges at two or more separate points of the one or more cartridges when the media flows through the one or more cartridges;
   c. a processor configured to calculate the flow of the media based on the detected displacement changes of the one or more cartridges at the two or more separate points.

2. The system of claim 1, further comprising a temperature-sensing device, wherein the processor is configured to calculate the flow of the media based further on the temperature measured in the one or more cartridges measured by the temperature-sensing device.

3. The system of claim 1, further comprising a pressure sensing device, wherein the processor is configured to calculate the flow of the media based further on the pressure measured in the one or more cartridges as measured by the pressure sensing device.

4. The system of claim 1, further comprising a vibration sensing device, wherein the processor is configured to calculate the flow of the media while compensating for the vibration measured at the one or more cartridges by the vibration sensing device.

5. The system of claim 1, further comprising an impact sensing device, wherein the processor is configured to calculate the flow of the media while compensating for the impact measured at the one or more cartridges by the impact sensing device.

6. The system of claim 1, wherein the processor is configured to calculate the mass of the media in the one or more cartridges.

7. The system of claim 1, wherein the one or more displacement sensing devices comprises a laser.

8. The system of claim 1, wherein the one or more displacement sensing devices further comprises an optical detector.

9. The system of claim 1, wherein the one or more displacement sensing devices further comprises an acoustic detector.

10. The system of claim 1, wherein the one or more displacement sensing devices further comprises a mechanical, electro-mechanical or piezoelectric displacement detector.

11. The system of claim 1, wherein the cartridge is flexible.

12. The system of claim 1, wherein the displacement sensing device does not physically contact the one or more cartridges.

13. The system of claim 1, wherein the processor is configured to acquire and process data points at a rate of up to one femtosecond.

14. The system of claim 1, wherein the processor is configured to calculate a flow velocity of the media based on the detected displacement changes of the one or more cartridges at the two or more separate points.

15. The system of claim 1, wherein the processor is configured to calculate a mass flow based in part on a calculated flow velocity and material mass.

16. The system of claim 1, wherein the one or more displacement sensing devices comprises a plurality of displacement sensing devices.

17. The system of claim 1 further comprising one or more supporting columns configured to support the one or more cartridges at any point or points between ends of the one or more cartridges.

18. The system of claim 1 further comprising supporting beams oriented laterally at radial spacing intervals.

19. The system of claim 1 where the one or more cartridges comprises a plurality of cartridges.

20. The system of claim 1 where the media comprises at least one of slurries, sludges, oils, dehydrated media, gaseous media or any other flowable media.

21. The system of claim 1 where the one or more cartridges is made of a flexible material.

22. The system of claim 1 where the flexibility of the one or more cartridges varies along its length to allow differential displacement at various sections of the one or more cartridges as any media progresses through the one or more cartridges.

23. The system of claim 1 where the one or more cartridges contain one or more targets that enhance non-contact or contact deflection measurements.

24. The system of claim 1 where the one or more cartridges is configured to have a vertical linear displacement proportional to the mass of the flowing media.

25. The system of claim 1 where the one or more cartridges comprise an abrasion or erosion resistant liner.

26. The system of claim 1 where the one or more cartridges comprise a chemically resistant or corrosion resistant liner.

27. The system of claim 1 where the one or more cartridges comprises a microbial or biohazard resistant liner.

28. The system of claim 1 where the one or more cartridges comprise a liner resistant to extreme temperature environments.

29. The system of claim 1 where the one or more cartridges comprises embedded organic or inorganic fibrous materials.

30. The system of claim 29 where the embedded fibrous materials are wound in a spiral configuration, or woven to form a fabric.

31. The system of claim 1 where the processor is configured to calculate the flow of a media based upon the displacement at one or more target locations on the one or more cartridges.

32. The system of claim 1 where the processor is configured to generate a characteristic Process Signature for the flow and density process variations of a media based upon the displacement at the two or more separate points.

33. The system of claim 1 where the processor is configured to generate process warning and action alarms for preset process variations of any media to facilitate Statistical Process Control.

34. The system of claim 1 where the processor is configured to generate a characteristic Process Signature to determine the degree of mixing or homogenization of multi component media based upon the displacement at the two or more separate points.

35. The system of claim 1 where the processor is configured to generate a characteristic process signature to determine the degree of mixing, pulverization, deflocculation or refinement of media based upon an RM Signature generated by the displacement at the two or more separate points.

36. The system of claim 1 where placement and orientation of reinforcements or additives within the one or more cartridges optimize the displacement changes.

37. The system of claim 1 where placement and orientation of reinforcements and matrix materials within the one or more cartridges maximize the structural integrity of connecting pipes to the one or more cartridges.

38. The system of claim 1, wherein the inflow media pipe and the outflow media pipe arranged on opposite sides of the one or more cartridges and oriented along a same direction as the one or more cartridges.

39. A system for continuously measuring the flow of a media, comprising:
 a first cartridge connected serially along the flow of the media between an inflow media pipe and an intermediate media pipe;
 a second cartridge connected serially along the flow of the media between the intermediate media pipe and an outflow media pipe;
 a first displacement-sensing device configured to detect displacement changes of the first cartridge when the media flows through the first cartridge;
 a second displacement-sensing device configured to detect displacement changes of the second cartridge when the media flows through the second cartridge; and
 a processor configured to calculate the flow of the media based on the detected displacement changes of the first and second cartridges.

40. The system of claim 39, wherein the inflow media pipe and the outflow media pipe arranged on opposite sides of the first cartridge and the second cartridge and oriented along a same direction as the first cartridge and the second cartridge.

41. The system of claim 39, further comprising a temperature-sensing device, wherein the processor is configured to calculate the flow of the media based further on the temperature measured in the first cartridge or the second cartridge measured by the temperature-sensing device.

42. The system of claim 39, further comprising a pressure sensing device, wherein the processor is configured to calculate the flow of the media based further on the pressure measured in the first cartridge or the second cartridge as measured by the pressure sensing device.

43. A system for continuously measuring the flow of a media, comprising:
 a. one or more cartridges connected serially along the flow of the media between an inflow media pipe and an outflow media pipe;

b. one or more displacement sensing devices adapted to monitor displacement changes of the one or more cartridges at two or more separate points of the one or more cartridges when the media flows through the one or more cartridges;
c. a base configured to provide stability for the one or more displacement sensing devices;
d. a pressure sensing device;
e. a temperature sensing device;
f. a vibration sensing device;
g. an impact sensing device; and
h. a processor configured to calculate the flow of the media based on the displacement changes of the one or more cartridges at the two or more separate points as well as variations in temperature or pressure.

44. The system of claim 43, where the inflow media pipe and the outflow media pipe are connected to the input and the output of the one or more cartridges via flanges or couplings.

45. The system of claim 44 where the geometry of the flanges or couplings to the one or more cartridges facilitate a high integrity mechanical structural connection between the flanges or couplings and the one or more cartridges.

46. The system of claim 44 where the geometry of the flanges or couplings facilitate a high integrity structural chemical bond between the flanges or couplings and the one or more cartridges.

47. The system of claim 44 where the flanges or couplings comprise metal, ceramic, organic or composite material.

48. The system of claim 43 where the system comprise one or more supporting beams configured to support the inflow media pipe and the outflow media pipe.

49. The system of claim 48 where base and supporting beams are further connected to a grounded surface.

50. The system of claim 49 where, the one or more displacement sensing devices, the pressure sensing device and temperature sensing device reside within an enclosure and housing for the one or more cartridges.

51. The system of claim 43 where the one or more cartridges comprises an outer pigmented layer identifying a pressure rating.

52. The system of claim 43, wherein the inflow media pipe and the outflow media pipe arranged on opposite sides of the one or more cartridges and oriented along a same direction as the one or more cartridges.

* * * * *